United States Patent
Tanaka et al.

(10) Patent No.: US 12,240,439 B2
(45) Date of Patent: Mar. 4, 2025

(54) HYBRID ELECTRIC VEHICLE

(71) Applicant: TOYOTA JIDOSHA KABUSHIKI KAISHA, Toyota (JP)

(72) Inventors: Hiroya Tanaka, Nagoya (JP); Motoshi Asada, Chiryu (JP); Mitsuru Yamaguchi, Ama (JP); Masato Yoshikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 18/045,869

(22) Filed: Oct. 12, 2022

(65) Prior Publication Data
US 2023/0234556 A1    Jul. 27, 2023

(30) Foreign Application Priority Data
Jan. 21, 2022  (JP) ................................ 2022-007886

(51) Int. Cl.
*B60W 20/15*    (2016.01)
*B60W 10/02*    (2006.01)
(Continued)

(52) U.S. Cl.
CPC ............ *B60W 20/15* (2016.01); *B60W 10/02* (2013.01); *B60W 10/08* (2013.01); *B60W 10/26* (2013.01); *B60W 2510/0676* (2013.01)

(58) Field of Classification Search
CPC ...... B60W 20/15; B60W 10/02; B60W 10/08; B60W 10/26; B60W 2510/0676;
(Continued)

(56) References Cited

U.S. PATENT DOCUMENTS
2022/0186688 A1*  6/2022  Oh ...................... F02D 41/0042

FOREIGN PATENT DOCUMENTS
JP    2000118246 A  *  4/2000
JP    2010241260 A  *  10/2010
(Continued)

OTHER PUBLICATIONS
Google Translation of JP2010241260A (Year: 2010).*
(Continued)

*Primary Examiner* — Sahar Motazedi
(74) *Attorney, Agent, or Firm* — Oblon, McClelland, Maier & Neustadt, L.L.P.

(57) ABSTRACT

A hybrid electric vehicle includes an engine, a motor, a clutch provided between the engine and the motor, a battery for charging regenerative electric power of the motor, and a control device that controls the engine, the motor, and the clutch. The control device includes a charge determination unit that determines whether the battery is chargeable when there is a deceleration request, and a deceleration control unit that executes, in a negative determination, a first deceleration process to decelerate the hybrid electric vehicle by friction torque of the engine, and executes, in a positive determination, a second deceleration process to decelerate the hybrid electric vehicle by regenerative torque of the motor. In the second deceleration process, the deceleration control unit causes the motor to output the friction torque at a rotational speed of the engine corresponding to a rotational speed of the motor as the regenerative torque.

6 Claims, 4 Drawing Sheets

(51) Int. Cl.
*B60W 10/08* (2006.01)
*B60W 10/26* (2006.01)

(58) Field of Classification Search
CPC ....... B60W 2510/244; B60W 2555/20; B60W 2710/0644; B60W 2710/083; B60W 10/06; B60W 2540/10; B60W 30/18127; B60W 30/18136; B60W 20/14; B60K 6/387; B60K 2006/4825; B60Y 2300/89; Y02T 10/62
See application file for complete search history.

(56) References Cited

FOREIGN PATENT DOCUMENTS

| | | | | | |
|---|---|---|---|---|---|
| JP | 2012116272 | A | * | 6/2012 | |
| JP | 2014213654 | A | * | 11/2014 | |
| JP | 2017094823 | A | * | 6/2017 | |
| JP | 2020-114683 | A | | 7/2020 | |
| JP | 2020108988 | A | * | 7/2020 | |
| WO | WO-2018189907 | A1 | * | 10/2018 | ........... B60K 17/348 |

OTHER PUBLICATIONS

Machine Translation of JP2000118246A (Year: 2000).*
Machine Translation of JP2012116272A (Year: 2012).*
Machine Translation of JP2014213654A (Year: 2014).*
Machine Translation of JP2017094823A (Year: 2017).*
Machine Translation of JP2020108988A (Year: 2020).*
Machine Translation of WO2018189907A1 (Year: 2018).*

* cited by examiner

HYBRID ELECTRIC VEHICLE

CROSS-REFERENCE TO RELATED APPLICATION

This application claims priority to Japanese Patent Application No. 2022-007886 filed on Jan. 21, 2022, incorporated herein by reference in its entirety.

BACKGROUND

1. Technical Field

The present disclosure relates to a hybrid electric vehicle.

2. Description of Related Art

A hybrid electric vehicle that has an engine, a motor provided on a power transmission path from the engine to a drive wheel, a clutch provided between the engine and the motor on the power transmission path, a battery for charging regenerative electric power of the motor, and a control device that controls the engine, the motor, and the clutch is well-known. In such a hybrid electric vehicle, when the battery cannot be charged, the speed is reduced by friction torque of the engine when a fuel cut process is executed, and when the battery is chargeable, the speed is reduced by regenerative torque of the motor (see, for example, Japanese Unexamined Patent Application Publication No. 2020-114683).

SUMMARY

When there is a variation between the deceleration feeling due to friction torque of an engine and the deceleration feeling due to regenerative torque of a motor, the driver may feel uncomfortable.

The present disclosure provides a hybrid electric vehicle that suppresses variations in a deceleration feeling.

A hybrid electric vehicle according to an aspect of the present disclosure includes an engine, a motor provided on a power transmission path from the engine to a drive wheel, a clutch provided between the engine and the motor on the power transmission path, a battery for charging regenerative electric power of the motor, and a control device that controls the engine, the motor, and the clutch. The control device includes a charge determination unit configured to determine whether the battery is chargeable when there is a deceleration request due to an accelerator being turned off, and a deceleration control unit configured to execute, when the charge determination unit makes a negative determination, a first deceleration process to decelerate the hybrid electric vehicle by friction torque of the engine when the clutch is engaged and a fuel cut process is executed while the motor is stopped, and execute, when the charge determination unit makes a positive determination, a second deceleration process to decelerate the hybrid electric vehicle by regenerative torque of the motor while the clutch is released. The deceleration control unit is configured to cause, in the second deceleration process, the motor to output the friction torque at a rotational speed of the engine corresponding to a rotational speed of the motor as the regenerative torque.

In the above aspect, the control device may include a stop determination unit configured to determine whether an intermittent stop of the engine is possible when there is the deceleration request. The deceleration control unit may execute the second deceleration process when both the charge determination unit and the stop determination unit make a positive determination, execute, when the charge determination unit makes a positive determination and the stop determination unit makes a negative determination, a third deceleration process in which the hybrid electric vehicle is decelerated by regenerative torque of the motor in a state where the clutch is engaged and the engine outputs idle torque, and cause, in the third deceleration process, the motor to output the total value of negative torque having an amount corresponding to the idle torque and the friction torque as the regenerative torque from the motor.

In the above aspect, the deceleration control unit may lower an amount of the friction torque in the regenerative torque as the external air pressure decreases.

In the above aspect, the deceleration control unit may lower an amount of the friction torque in the regenerative torque as the temperature of the engine increases.

With the aspect of the present disclosure, it is possible to provide a hybrid electric vehicle that suppresses variations in deceleration feeling.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Outline Configuration of Hybrid Electric Vehicle

Figure 1:
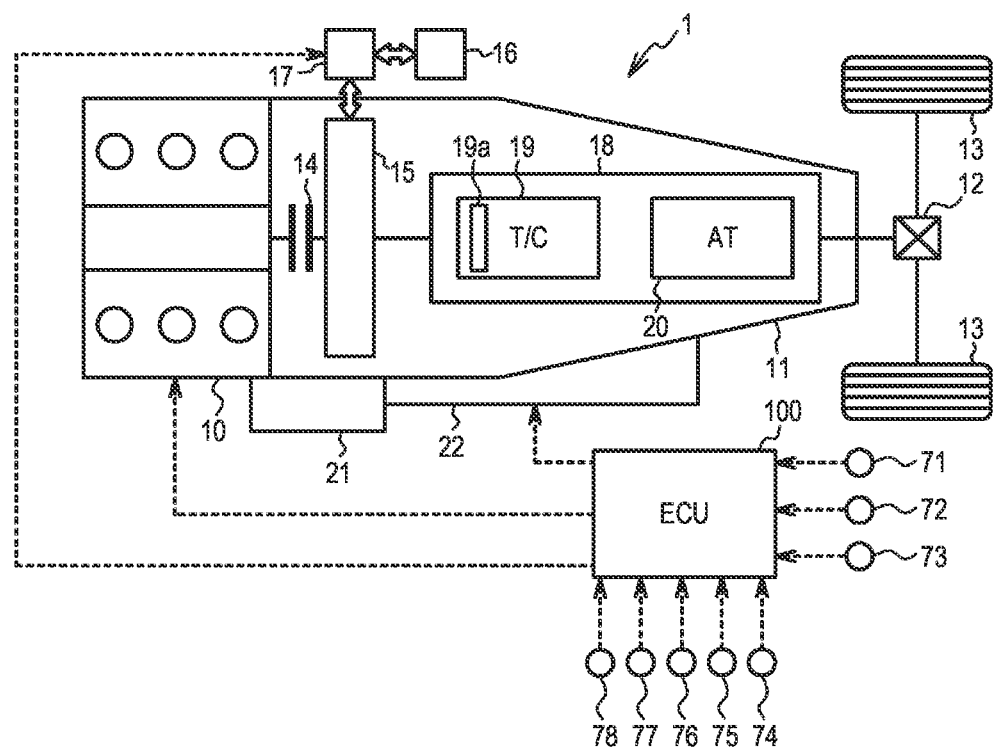
FIG. 1 is a schematic configuration diagram of a hybrid electric vehicle.

FIG. 1 is a schematic configuration diagram of a hybrid electric vehicle 1. The hybrid electric vehicle 1 is provided with a K0 clutch 14, a motor 15, and a transmission 18 in that order along a power transmission path from an engine 10 to drive wheels 13. The engine 10 and the motor 15 are mounted as a traveling drive source for the hybrid electric vehicle 1. The engine 10 is, for example, a V6 engine, but the number of cylinders is not limited to this, and may be a straight gasoline engine or a diesel engine. The K0 clutch 14, the motor 15, and the transmission 18 are provided in a transmission unit 11. The transmission unit 11 and the right and left drive wheels 13 are drive-connected via a differential 12. The transmission 18 includes a torque converter 19 and a transmission 20.

The K0 clutch 14 is provided between the engine 10 and the motor 15 on the same power transmission path. The K0 clutch 14 receives hydraulic pressure in a released state and enters an engaged state to connect the power transmission between the engine 10 and the motor 15. The K0 clutch 14 becomes the released state when the hydraulic pressure supply is stopped, and cuts off the power transmission between the engine 10 and the motor 15. The engaged state is a state in which both engaging elements of the K0 clutch 14 are connected and the engine 10 and the motor 15 have the same rotational speed. The released state is a state in which both engaging elements of the K0 clutch 14 are separated from each other.

The motor 15 is connected to a battery 16 via an inverter 17. The motor 15 functions as a motor that generates a driving force for the vehicle in response to electric power supplied from the battery 16, and also functions as a generator that generates regenerative electric power that charges the battery 16 in response to power transmission from the engine 10 and the drive wheel 13. The electric power transferred between the motor 15 and the battery 16 is adjusted by the inverter 17.

The inverter 17 is controlled by an ECU 100 described below, and converts a direct voltage from the battery 16 into an alternating voltage, or converts an alternating voltage from the motor 15 into a direct voltage. In the case of power running operation in which the motor 15 outputs torque, the inverter 17 converts the direct voltage of the battery 16 into the alternating voltage to adjust the electric power supplied to the motor 15. In the case of regenerative operation in which the motor 15 generates electricity, the inverter 17 converts the alternating voltage from the motor 15 into the direct voltage to adjust the regenerative electric power supplied to the battery 16.

The torque converter 19 is a fluid joint having a torque amplification function. The transmission 20 is a stepped automatic transmission that switches the gear ratio in multiple stages by switching gears, but is not limited to this, and may be a continuously variable transmission. The transmission 20 is provided between the motor 15 and the drive wheels 13 on the power transmission path. The motor 15 and the transmission 20 are connected via the torque converter 19. The torque converter 19 is provided with a lockup clutch 19a that receives hydraulic pressure and is in an engaged state to directly connect the motor 15 and the transmission 20.

The transmission unit 11 is further provided with an oil pump 21 and a hydraulic pressure control mechanism 22. The hydraulic pressure generated by the oil pump 21 is supplied to the K0 clutch 14, the torque converter 19, the transmission 20, and the lockup clutch 19a, respectively, via the hydraulic pressure control mechanism 22. The hydraulic pressure control mechanism 22 is provided with hydraulic circuits for each of the K0 clutch 14, the torque converter 19, the transmission 20, and the lockup clutch 19a, and various hydraulic control valves for controlling their working hydraulic pressure.

The hybrid electric vehicle 1 is provided with the electronic control unit (ECU) 100 as a control device for the vehicle. The ECU 100 is an electronic control unit including an arithmetic processing circuit that performs various arithmetic processing related to vehicle travel control, and a memory in which programs and data for the control are stored. The ECU 100 is an example of a control device, and functionally realizes a charge determination unit, a deceleration control unit, and a stop determination unit, which will be described in detail below.

The ECU 100 controls the drive of the engine 10 and the motor 15. Specifically, the ECU 100 controls the torque and the rotational speed of the engine 10 by controlling the throttle opening degree, the ignition time, and the fuel injection amount of the engine 10. The ECU 100 controls the power running torque, regenerative torque, and rotational speed of the motor 15 by controlling the inverter 17 to adjust the amount of electric power transferred between the motor 15 and the battery 16. Further, the ECU 100 controls the drive of the K0 clutch 14, the lockup clutch 19a, and the transmission 20 through the control of the hydraulic pressure control mechanism 22. The lockup clutch 19a is engaged when the vehicle speed is equal to or higher than a predetermined value, and is released when the vehicle speed is lower than the predetermined value.

Signals from an ignition switch 71, a crank angle sensor 72, a motor rotational speed sensor 73, an accelerator position sensor 74, a vehicle speed sensor 75, an SOC sensor 76, a water temperature sensor 77, and an external pressure sensor 78 are input to the ECU 100. The crank angle sensor 72 detects the rotational speed of a crankshaft of the engine 10, that is, the rotational speed of the engine. The motor rotational speed sensor 73 detects the rotational speed of an output shaft of the motor 15, that is, the motor rotational speed. The accelerator position sensor 74 detects the opening degree of the accelerator pedal, which is the amount by which a driver presses the accelerator pedal. The vehicle speed sensor 75 detects the traveling speed of the hybrid electric vehicle 1. The SOC sensor 76 detects a state of charge (SOC) indicating the charge amount of the battery 16. The water temperature sensor 77 detects the temperature of the cooling water of the engine 10. The external pressure sensor 78 detects the pressure of the outside air.

The ECU 100 drives the hybrid electric vehicle in either a motor mode or a hybrid mode. In the motor mode, the ECU 100 releases the K0 clutch 14 and drives the hybrid electric vehicle by the power of the motor 15. In the hybrid mode, the ECU 100 switches the state of the K0 clutch 14 to the engaged state and drives the hybrid electric vehicle at least by the power of the engine 10. The hybrid mode includes a mode in which the motor 15 is driven by power running and the hybrid electric vehicle travels using both the engine 10 and the motor 15 as power sources, a mode in which the motor is regeneratively driven and the hybrid electric vehicle travels using only the power of the engine 10, and a mode in which the driving of the motor is stopped and the hybrid electric vehicle travels using only the power of the engine 10.

The switching of the traveling mode is performed based on the required driving force of the vehicle obtained from the vehicle speed and the opening degree of the accelerator, the SOC of the battery 16, and the like. For example, when the required driving force is relatively small and the SOC is relatively high, the motor mode in which the engine 10 stops is selected in order to improve fuel efficiency. When the required driving force is relatively large or the SOC is relatively low, the hybrid mode in which the engine 10 drives is selected.

The ECU 100 executes intermittent operation control for intermittently stopping the engine 10 when a predetermined stop condition is satisfied in the hybrid mode and restarting the engine 10 when a predetermined automatic restart condition is satisfied.

Deceleration Control

Figure 2:
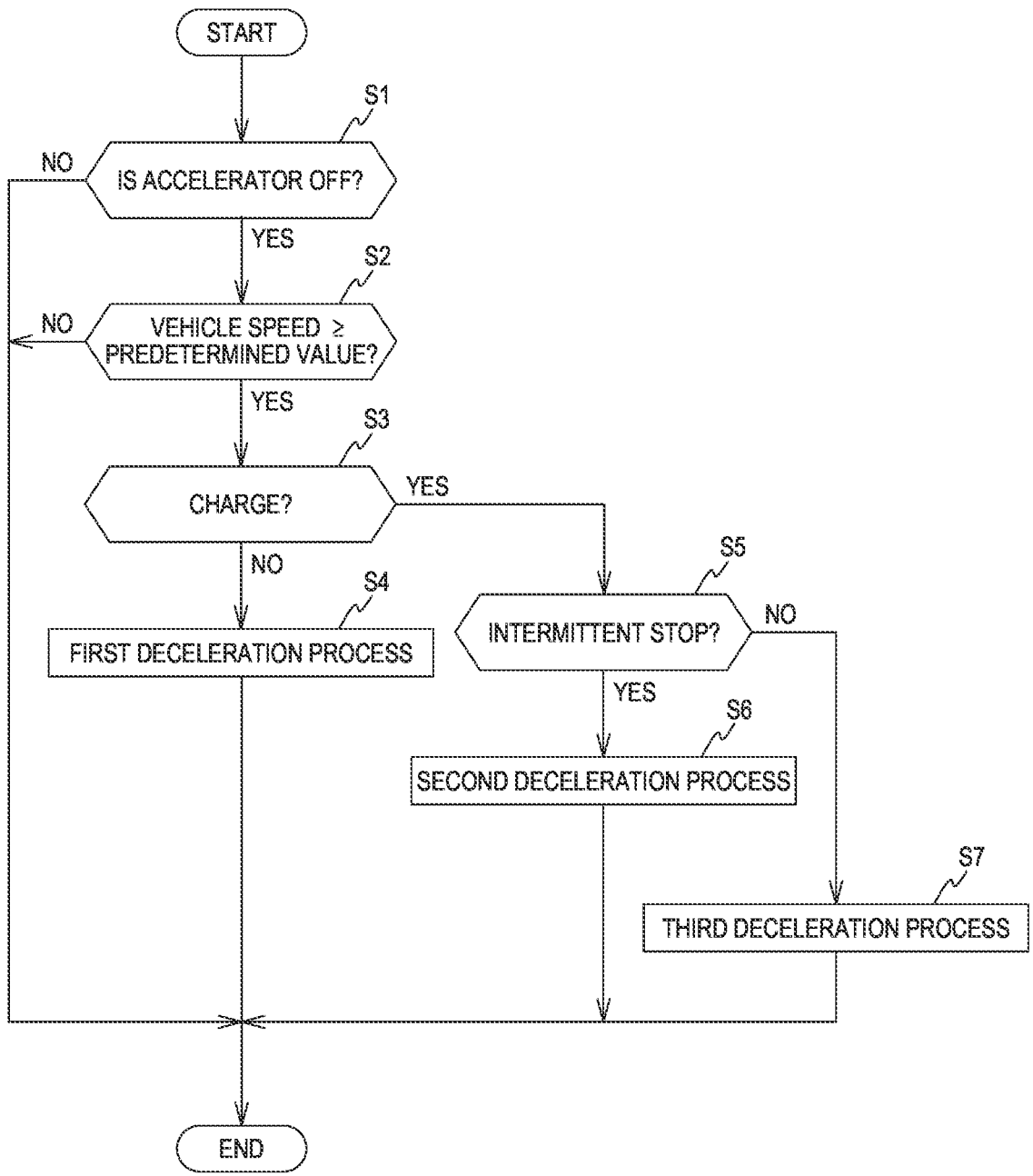
FIG. 2 is a flowchart illustrating an example of deceleration control executed by an ECU.

FIG. 2 is a flowchart illustrating an example of deceleration control executed by the ECU 100. This control is repeatedly executed at predetermined intervals with the ignition turned on. The ECU 100 determines whether an accelerator being turned off in which the opening degree of the accelerator becomes zero is detected based on the detection value of the accelerator position sensor 74 (step S1). When No in step S1, this control ends.

When Yes in step S1, the ECU 100 determines whether the vehicle speed detected by the vehicle speed sensor 75 is equal to or higher than a predetermined value (step S2). Here, the predetermined value is the minimum value of the vehicle speed with which the lockup clutch 19a is engaged as described above. When No in step S2, this control ends.

When Yes in step S2, the ECU 100 determines whether the battery 16 is chargeable (step S3). In particular, when the SOC of the battery 16 detected by the SOC sensor 76 is less than the upper limit value, the ECU 100 determines that the battery 16 is chargeable, and when the SOC is equal to or more than the upper limit value, the ECU 100 determines that the battery 16 is unchargeable. The upper limit is the SOC in a fully charged state in which the battery 16 cannot be charged any more. Step S3 is an example of the process executed by the charge determination unit.

When No in step S3, the ECU 100 executes a first deceleration process (step S4). The first deceleration process is a process in which the hybrid electric vehicle 1 is decelerated by the friction torque of the engine 10 by executing a fuel cut in the engine 10 while the K0 clutch 14 and the lockup clutch 19a are engaged and the motor 15 is stopped. In this way, the friction torque of the engine 10 is transmitted to the drive wheel 13 to decelerate the hybrid electric vehicle 1. Further, since the hybrid electric vehicle 1 can decelerate without the regenerative torque of the motor 15, it is possible to decelerate the hybrid electric vehicle 1 while preventing the overcharge of the battery 16. The operation stopped state of the motor 15 is a state in which the transfer of electric power between the motor 15 and the battery 16 is cut off, and both the output torque and the regenerative torque of the motor 15 are zero. Step S4 is an example of the process executed by the deceleration control unit.

When Yes in step S3, the ECU 100 determines whether an intermittent stop of the engine 10 is possible (step S5). For example, the ECU 100 determines that the engine 10 can be intermittently stopped when the temperature of the cooling water detected by the water temperature sensor 77 is equal to or higher than the warm-up completion temperature indicating the completion of the warm-up of the engine 10, and the ECU 100 determines that the intermittent stop of the engine 10 is possible when the temperature of the cooling water is lower than the warm-up completion temperature. When the engine 10 is intermittently stopped when the temperature of the cooling water is lower than the warm-up completion temperature, the temperature of the engine 10 will be further lowered when the engine 10 is restarted, which may affect the exhaust emission. Step S5 is an example of the process executed by the stop determination unit.

When Yes in step S5, the ECU 100 executes a second deceleration process (step S6). The second deceleration process is a process of decelerating the hybrid electric vehicle 1 by the regenerative torque of the motor 15 in a state where the engine 10 is intermittently stopped, the K0 clutch 14 is released, and the lockup clutch 19a is engaged. In this way, the regenerative torque of the motor 15 is transmitted to the drive wheel 13 to decelerate the hybrid electric vehicle 1. Further, since the engine 10 is intermittently stopped, deterioration of fuel efficiency can be prevented. Step S6 is an example of the process executed by the deceleration control unit.

When No in step S5, the ECU 100 executes a third deceleration process (step S7). The third deceleration process is a process of decelerating the hybrid electric vehicle 1 by the regenerative torque of the motor 15 in a state where the K0 clutch 14 and the lockup clutch 19a are engaged and the engine 10 outputs idle torque. The state in which the engine 10 outputs the idle torque is a state in which the engine 10 is controlled to an idle operation state. When the engine 10 cannot stop intermittently, the engine 10 is controlled to the idle operation state, and the regenerative torque of the motor 15 is transmitted to the drive wheel 13 to decelerate the hybrid electric vehicle 1. Step S7 is an example of the process executed by the deceleration control unit. As described above, when there is a deceleration request due to the accelerator being turned off, the ECU 100 selects and executes any of the first to third deceleration processes.

Deceleration Torques in First to Third Deceleration Processes

Figure 3:
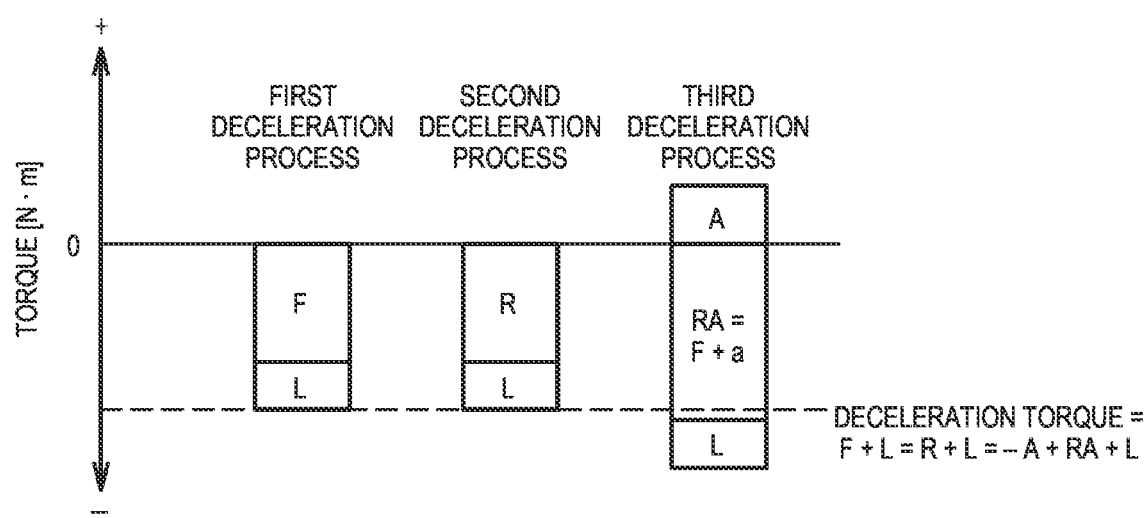
FIG. 3 is an explanatory diagram of deceleration torques in first to third deceleration processes.

Next, the deceleration torques in the first to third deceleration processes will be described. FIG. 3 is an explanatory diagram of the deceleration torques in the first to third deceleration processes. The vertical axis of FIG. 3 shows torque. Torque with a positive value indicates positive torque acting on the engine 10 or the motor 15 in a direction of rotation. A torque with a negative value indicates negative torque acting on the engine 10 or the motor 15 in a direction opposite to the direction of rotation. FIG. 3 illustrates the deceleration torques in the first to third deceleration processes when the rotational speed of the output shaft of the motor 15, that is, the motor rotational speed is the same.

In the first deceleration process, the hybrid electric vehicle 1 is decelerated by friction torque F and load torque L of the engine 10. As described above, the friction torque F is negative torque that becomes a resistance to the rotation of the engine 10 during the execution of the fuel cut in the engine 10. The load torque L is the total value of a torque corresponding to the load of the electric power consumption of auxiliary machines and a torque corresponding to the load of the transmission 18. The load torque L is negative torque acting on the drive wheel 13 regardless of the operating state of the engine 10 and the motor 15 and the engaged state of the K0 clutch 14 and the lockup clutch 19a.

In the second deceleration process, regenerative torque R corresponding to the friction torque F is output from the motor 15. The deceleration torque in the second deceleration process can be expressed as (R+L), and the relationship of (R+L)=(F+L) is established. As a result, the same deceleration feeling as in the first deceleration process can be ensured in the second deceleration process. The ECU 100 calculates the friction torque F, which will be described in detail below, and outputs the calculated friction torque F as the regenerative torque R from the motor 15.

In the third deceleration process, idle torque A is output from the engine 10 and regenerative torque RA is output from the motor 15. The regenerative torque RA corresponds to the sum of the above-described friction torque F and negative torque a having a magnitude corresponding to the idle torque A. In the third deceleration process, the deceleration torque can be expressed by (−A+RA+L), and the relationship of (−A+RA+L)=(−A+F+a+L)=(F+L) is established. As a result, the same deceleration feeling as in the first deceleration process can be ensured in the third deceleration process. The ECU 100 uses the torque required for the engine 10 in the idle operation state as the idle torque A when calculating the regenerative torque RA. In this way, since the deceleration torque becomes substantially the same value in the first to third deceleration processes, the variation in the deceleration feeling is restricted, and thus it is possible to avoid giving the driver a sense of discomfort.

Friction Torque Calculation Method

Figure 4A:
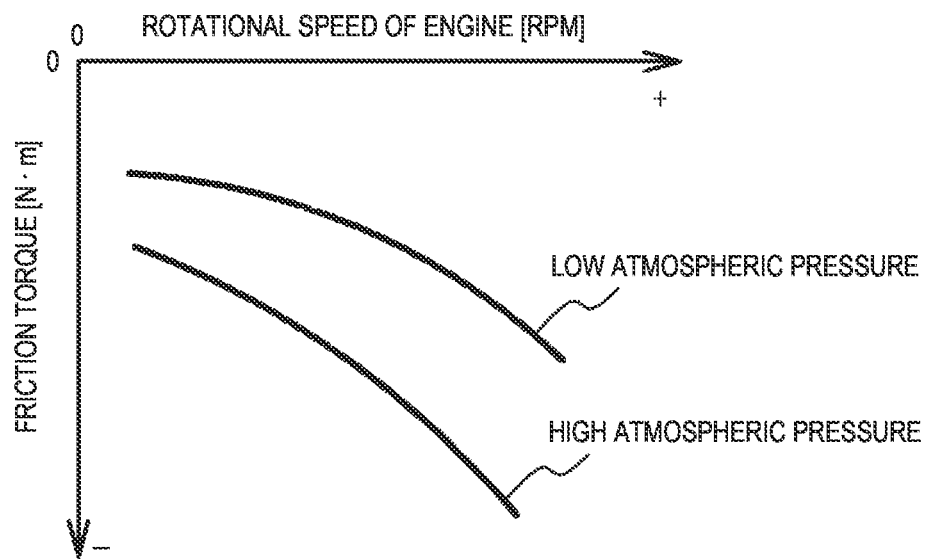
FIG. 4A is a map defining a relationship between engine speed and friction torque.
Figure 4B:
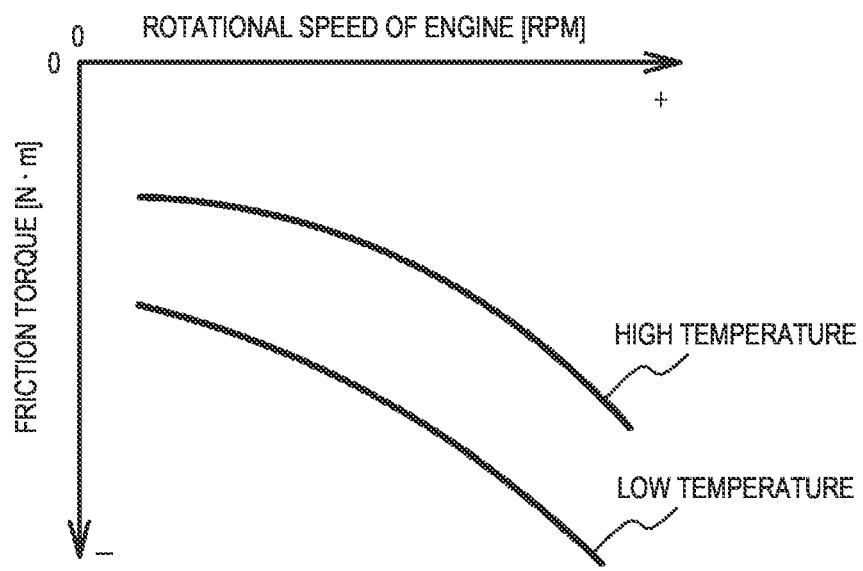
FIG. 4B is a map defining a relationship between engine speed and friction torque.

Next, an explanatory drawing of the calculation method of the friction torque will be described. FIGS. 4A and 4B are maps defining the relationship between the rotational speed of the engine and the friction torque. FIG. 4A illustrates the relationship between the case where the external air pressure is high and the case where the external air pressure is low. FIG. 4B illustrates the relationship between the case where the temperature of the cooling water is high and the case where the temperature of the cooling water is low. As illustrated in FIGS. 4A and 4B, the higher the rotational speed of the engine, the higher the friction torque.

As illustrated in FIG. 4A, the lower the external air pressure, the lower the friction torque. The reason for this is as follows. The lower the external air pressure, the lower the amount of air introduced into the cylinder when the fuel is not supplied thereto. Therefore, the repulsive force against the rotation of the engine 10 due to the air in the cylinder in a compression stroke also decreases, and thus the friction torque also decreases. Further, as illustrated in FIG. 4B, the higher the temperature of the cooling water, the lower the friction torque. The reason for this is as follows. The higher the cooling water temperature, the higher the temperature of a lubricating oil of the engine 10 and the lower the viscosity of the lubricating oil. Accordingly, the frictional force of a drive unit of the engine 10 decreases.

The maps of FIGS. 4A and 4B are acquired in advance by experiments and stored in the memory of the ECU 100. The ECU 100 calculates the friction torque at the rotational speed of the engine corresponding to the rotational speed of the motor based on the temperature of the cooling water and the external air pressure detected by the water temperature sensor 77 and the external pressure sensor 78 with reference to these maps. The calculation of the friction torque is not limited to referring to such maps, and may be calculated by an arithmetic expression with the external air pressure and the temperature of the cooling water as parameters. Further, the temperature of the cooling water is used as the temperature of the engine 10, but the temperature is not limited to this, and the temperature of the lubricating oil of the engine 10 may be used.

By accurately calculating the friction torque in this way, it is possible to further prevent variations in the deceleration feeling. However, the calculated friction torque does not have to exactly match the actual friction torque. For example, when the calculated friction torque is included in a range of +25% of the actual friction torque, it is possible to prevent the driver's discomfort due to the variation in the deceleration feeling. When the calculated friction torque is preferably included in a range of +20% of the actual friction torque, the variation in the deceleration feeling can be further prevented.

In the above example, the hybrid electric vehicle 1 has the torque converter 19 having the lockup clutch 19a, but such a torque converter may not be provided. In this case, the process of step S2 is not necessary.

In the above example, when No in step S5, the third deceleration process is executed. However, for example, the second deceleration process may be executed without executing the third deceleration process and without executing the determination in step S5. That is, the K0 clutch 14 may be released while the operation of the engine 10 is continued, and the speed may be reduced by the regenerative torque of the motor 15. Even in this case, it is possible to prevent variations in deceleration torque in the first and second deceleration processes.

In the above example, the case where the hybrid electric vehicle is controlled by the single ECU 100 is illustrated, but the present disclosure is not limited to this. The above-described control may be executed by a plurality of ECUs such as an engine ECU that controls the engine 10, a motor ECU that controls the motor 15, a clutch ECU that controls the K0 clutch 14, and a T/M ECU that controls the transmission 18.

Although the example of the present disclosure is described in detail above, the present disclosure is not limited to such a specific example, and various modifications and changes are possible within the scope of the gist of the present disclosure described in the claims.

What is claimed is:

1. A hybrid electric vehicle comprising:
   an engine;
   a motor provided on a power transmission path from the engine to a drive wheel;
   a clutch provided between the engine and the motor on the power transmission path;
   a battery configured to charge regenerative electric power of the motor; and
   a control device configured to control the engine, the motor, and the clutch, the control device includes:
      a charge determination unit configured to determine whether the battery is chargeable when there is a deceleration request due to an accelerator being turned off, the charge determination unit making a first negative determination being the charge determination unit determining that the battery is not chargeable, the charge determination unit making a first positive determination being the charge determination unit determining that the battery is chargeable;
      a deceleration control unit configured to:
         execute, when the charge determination unit makes the first negative determination, a first deceleration process for decelerating the hybrid electric vehicle by friction torque of the engine by executing a fuel cut in the engine while the clutch is engaged and the motor is stopped,
         execute, when the charge determination unit makes the first positive determination, a second deceleration process for decelerating the hybrid electric vehicle by regenerative torque of the motor while the clutch is released, and
         cause, in the second deceleration process, the motor to output the friction torque at a rotational speed of the engine corresponding to a rotational speed of the motor as the regenerative torque; and
      a stop determination unit configured to determine whether an intermittent stop of the engine is possible when there is the deceleration request, the stop determination unit making a second positive determination being the stop determination unit determining that the intermittent stop of the engine is possible, the stop determination unit making a second negative determination being the stop determination unit determining that the intermittent stop of the engine is not possible,
   wherein the deceleration control unit is configured to:
      execute the second deceleration process when the charge determination unit makes the first positive determination, and the stop determination unit makes the second positive determination;
      execute, when the charge determination unit makes the first positive determination and the stop determination unit makes the second negative determination, a third deceleration process for decelerating the hybrid electric vehicle by the regenerative torque of the motor in a state where the clutch is engaged and the engine outputs idle torque; and cause, in the third deceleration process, the motor to output a total value of negative torque having an amount corresponding to the idle torque and the friction torque as the regenerative torque.

2. The hybrid electric vehicle according to claim 1, wherein the deceleration control unit is configured to lower an amount of the friction torque in the regenerative torque as an external air pressure decreases.

3. The hybrid electric vehicle according to claim 1, wherein the deceleration control unit is configured to lower an amount of the friction torque in the regenerative torque as a temperature of the engine increases.

4. A hybrid electric vehicle comprising:
   an engine;
   a motor provided on a power transmission path from the engine to a drive wheel;
   a clutch provided between the engine and the motor on the power transmission path;
   a battery configured to charge regenerative electric power of the motor; and
   processing circuitry configured to control the engine, the motor, and the clutch, the processing circuitry configured to:
      determine whether the battery is chargeable when there is a deceleration request due to an accelerator being turned off, making a first negative determination when determining that the battery is not chargeable, and making a first positive determination when determining that the battery is chargeable;
      execute, when the first negative determination is made, a first deceleration process for decelerating the hybrid electric vehicle by friction torque of the engine by executing a fuel cut in the engine while the clutch is engaged and the motor is stopped;
      execute, when the first positive determination is made, a second deceleration process for decelerating the hybrid electric vehicle by regenerative torque of the motor while the clutch is released, and cause, in the second deceleration process, the motor to output the friction torque at a rotational speed of the engine corresponding to a rotational speed of the motor as the regenerative torque;
      determine whether an intermittent stop of the engine is possible when there is the deceleration request, making a second positive determination when determining that the intermittent stop of the engine is possible, and making a second negative determination when determining that the intermittent stop of the engine is not possible;
      execute the second deceleration process when the first positive determination and the second positive determination are made;
      execute, when the first positive determination and the second negative determination are made, a third deceleration process for decelerating the hybrid electric vehicle by the regenerative torque of the motor in a state where the clutch is engaged and the engine outputs idle torque; and
      cause, in the third deceleration process, the motor to output a total value of negative torque having an amount corresponding to the idle torque and the friction torque as the regenerative torque.

5. The hybrid electric vehicle according to claim 4, wherein the processing circuitry is configured to lower an amount of the friction torque in the regenerative torque as an external air pressure decreases.

6. The hybrid electric vehicle according to claim 4, wherein the processing circuitry is configured to lower an amount of the friction torque in the regenerative torque as a temperature of the engine increases.

* * * * *